May 3, 1927.
L. D. SOUBIER
1,626,707
APPARATUS FOR TRANSFERRING GLASS ARTICLES
Filed March 31, 1924    5 Sheets-Sheet 1
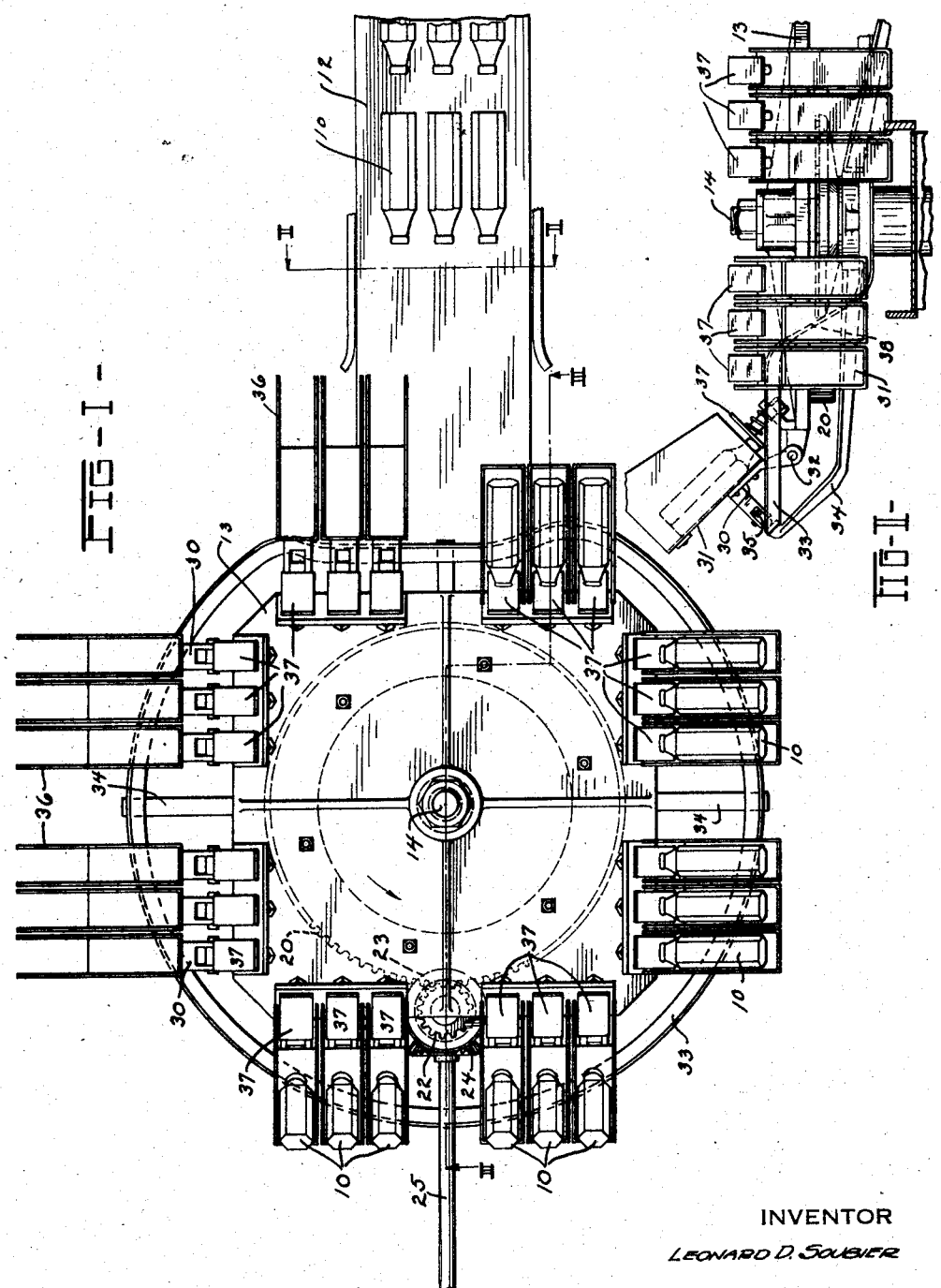
INVENTOR
LEONARD D. SOUBIER
BY J. F. Rule.
HIS ATTORNEY

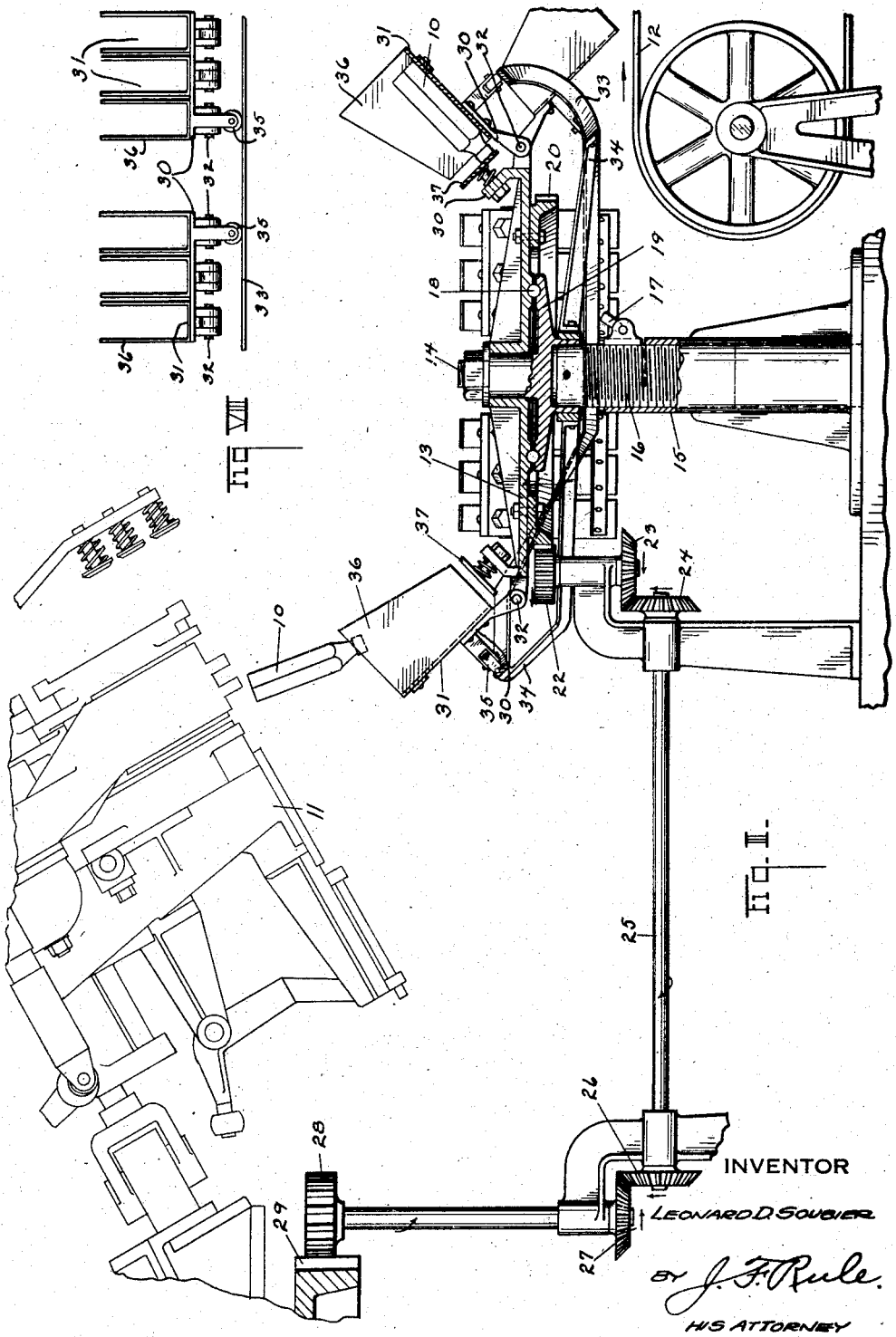

May 3, 1927. 1,626,707
L. D. SOUBIER
APPARATUS FOR TRANSFERRING GLASS ARTICLES
Filed March 31, 1924 5 Sheets-Sheet 3
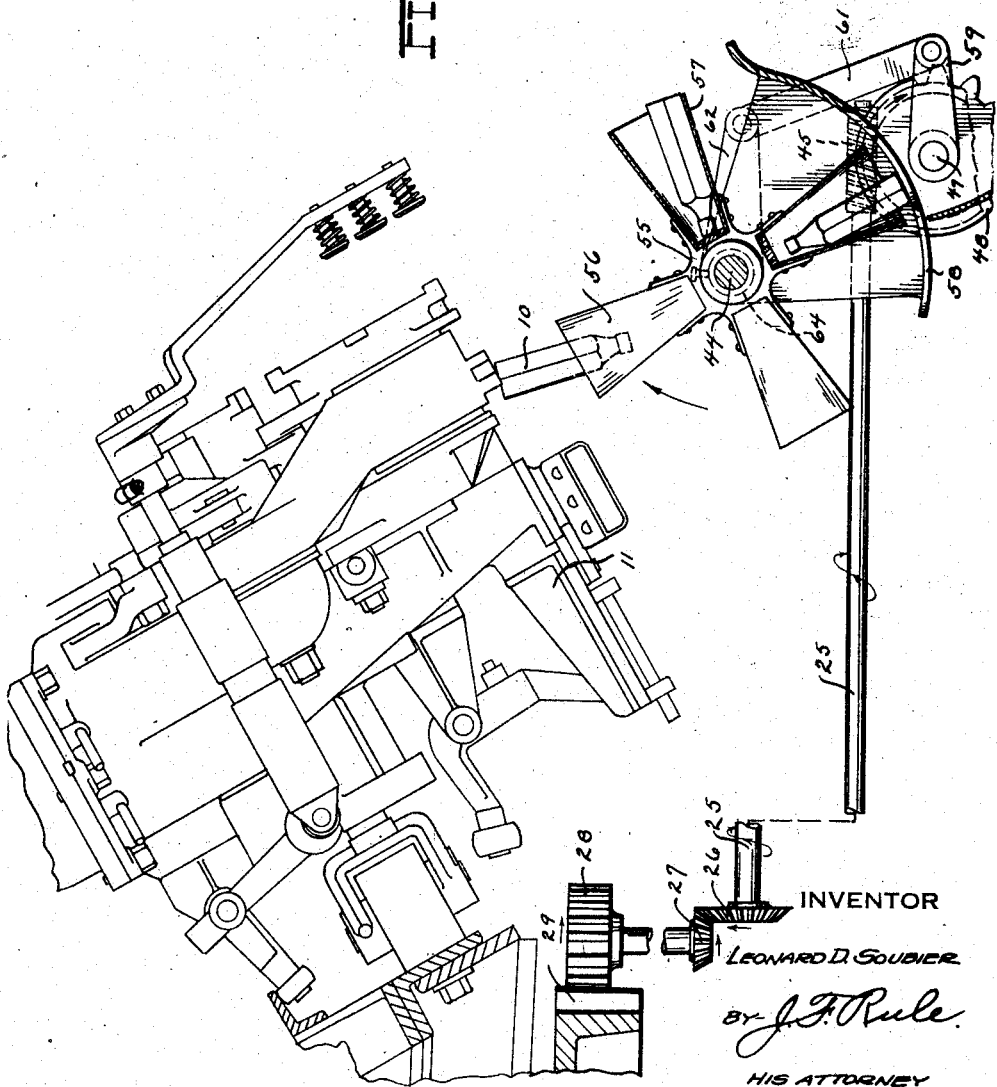
FIG-IV
INVENTOR
LEONARD D. SOUBIER
BY J. F. Rule
HIS ATTORNEY

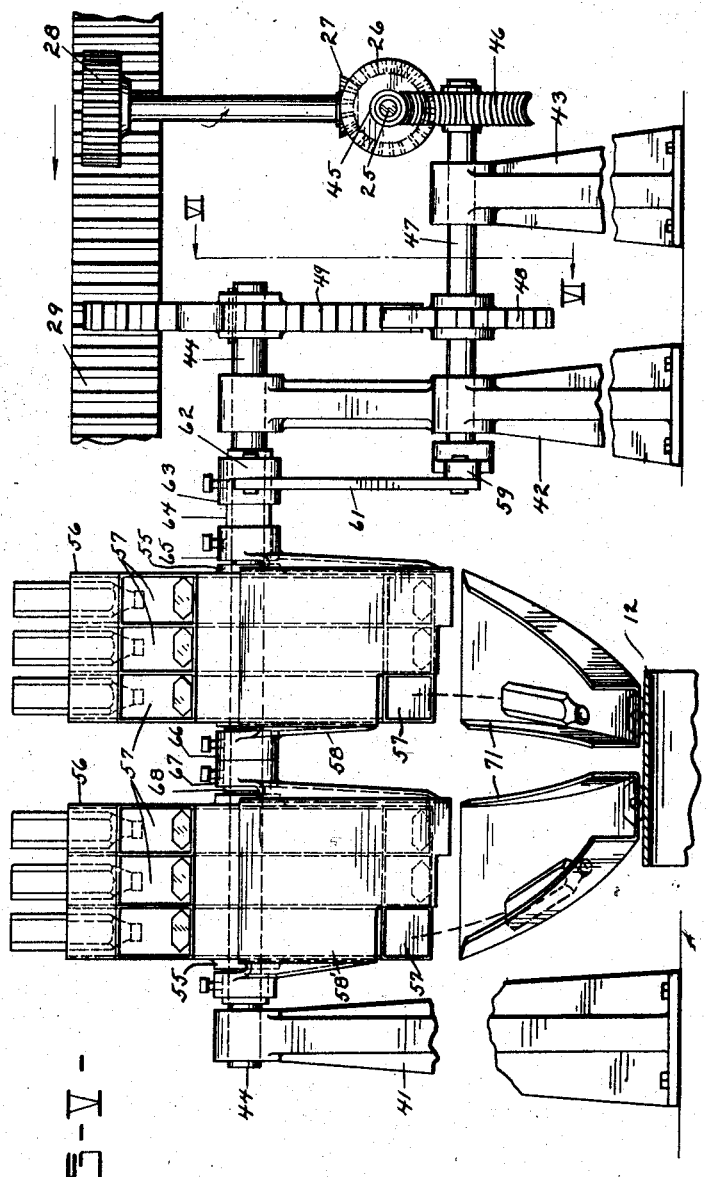

May 3, 1927.
L. D. SOUBIER
1,626,707
APPARATUS FOR TRANSFERRING GLASS ARTICLES
Filed March 31, 1924   5 Sheets-Sheet 5
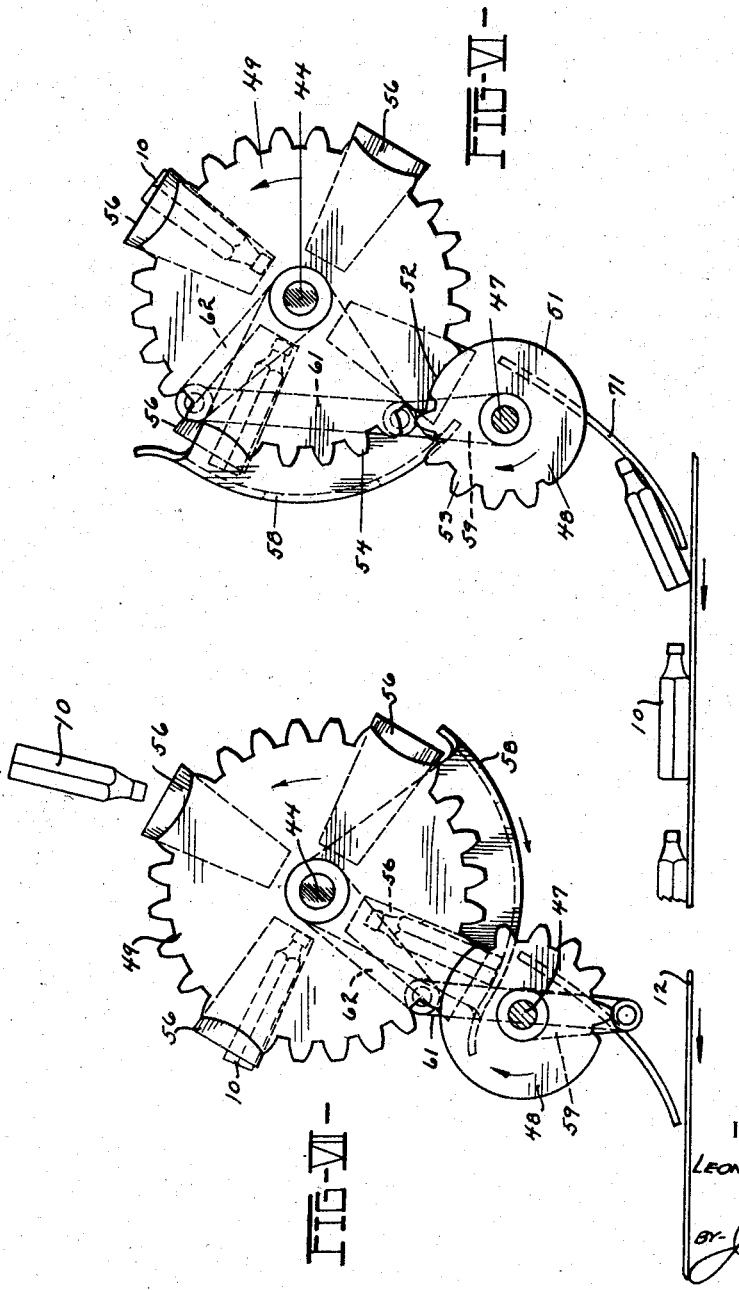
INVENTOR
LEONARD D. SOUBIER
BY J. F. Rule
HIS ATTORNEY Patented May 3, 1927.

1,626,707

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

APPARATUS FOR TRANSFERRING GLASS ARTICLES.

Application filed March 31, 1924. Serial No. 703,048.

My invention relates to apparatus designed for receiving bottles, jars or other glass articles as they are discharged from a forming machine and carrying them away from the machine. The apparatus may be used to transfer the articles to a conveyor by which they are carried to an annealing leer. In the particular form of the invention herein illustrated, the apparatus is designed for receiving and transferring a plurality of such articles at a time, which articles are delivered from the forming machine in multiples or groups. Such articles when they are discharged from the molds of a forming machine are soft and plastic and must be handled with care to prevent them from being marred or distorted. Also, if the articles are permitted to come in contact with each other while in such hot, soft condition, there is a tendency for them to stick together.

An object of the present invention is to provide practical apparatus for receiving the bottles or other articles as discharged from the molds, keeping them separated and handling them in a manner to prevent marring or distortion until they have cooled and hardened.

Other objects of the invention will appear hereinafter.

In the occompanying drawings:

Figure 1 is a plan view of an apparatus constructed in accordance with my invention.

Figure 2 is a sectional elevation at the plane of the line II—II on Figure 1.

Figure 3 is a sectional elevation, the section being taken at the line III—III on Figure 1, and also shows a portion of the bottle blowing machine.

Figure 4 is a part sectional elevation of a modified construction.

Figure 5 is a front elevation of the apparatus shown in Figure 4.

Figure 6 is a sectional elevation at the line VI—VI on Figure 5.

Figure 7 is a view similar to Figure 6, but with the parts moved to a different position.

Figure 8 is a detail view showing a pair of carriers.

Referring particularly to Figures 1, 2 and 3, the apparatus for transferring the bottles 10 or other glass articles from the molds of the forming machine 11 to the conveyor 12, comprises a table or carriage 13 mounted for horizontal rotation on a central column 14. The latter comprises a hollow standard 15 in which a screw threaded post 16 is mounted for vertical adjustment, being held in adjusted position by a clamp 17. Bearing balls 18 are interposed between the table 13 and a bearing plate 19 secured to the post 16.

An annular gear 20 secured to the under side of the table 13, is driven by a pinion 22 having a driving connection through bevel gears 23 and 24 with a horizontal shaft 25 which has a driving connection through bevel gears 26, 27 and a pinion 28 with a gear 29 on the continuously rotating carriage of the machine 11. The latter as herein shown is a bottle blowing machine of the Owens type having a plurality of heads or units brought successively to bottle discharging position. Each unit carries a group of molds from which a plurality of bottles or other blown articles are simultaneously discharged as the unit reaches the discharging position.

Mounted on the carriage 13 are carriers 30 arranged in pairs and each comprising a plurality of individual supports or holders 31 for the individual articles 10. As here shown, each carrier comprises three such individual holders although the number might obviously be increased or decreased, depending upon the number of articles being discharged from each unit of the blowing machine. The carriers 30 have pivotal connections 32 with the carriage 13 to permit said carriers to swing up and down. The swinging or tilting movement of the carriers is controlled by a stationary cam track 33 supported on arms 34 carried by the post 16. Each carrier 30 is provided with a roll 35 running on the cam track. Each of the supports or holders 31 is provided with side walls 36 forming with the supports individual pockets or compartments by which the bottles 10 are held out of contact with each other. Associated with each holder 31 is a spring bottom plate 37. The bottles 10 are ordinarily discharged from the machine 11 neck end downward, as indicated in Fig. 3, and dropped onto the holders 31, the neck end of the bottle striking the spring bottom 37 which yields sufficiently to prevent injury to the bottle.

With the particular form of bottle machine 11 herein shown, the mold carriage rotates continuously and causes a continuous rotation of the table 13 with its transfer carriers 30. Each pair of carriers as they are brought into receiving position beneath the machine 11 receive the six bottles 10 which may be simultaneously discharged from the machine. As the table 13 rotates, the carriers 30 with the bottles therein are brought around to a position over the conveyor 12. The cam track 33 has an inclined portion 38 (Fig. 2) so positioned that each carrier 30 is permitted to swing downward as indicated at the right hand side of Fig. 3, when the carrier reaches a position over the conveyor 12. The bottles are thus permitted to slide downward off the carrier onto the conveyor. The latter traveling in the direction indicated by the arrow, carries the bottles to the annealing leer.

It will be noted that the bottles are kept out of contact with each other during their transfer from the molds to the conveyor 12 and also that they are placed on said conveyor without contacting with each other. The bottles are thus permitted to cool and harden without coming in contact with each other, whereby they are prevented from sticking together. The apparatus is, moreover, designed to handle the bottles in a gentle manner that will prevent them from being marred or distorted while they are still soft.

Figures 4 to 7 inclusive illustrate a modification in which the carriers are rotated about a horizontal axis to transfer the bottles. The apparatus here shown is mounted on standards 41, 42 and 43. The shaft 25 is driven from the gear 29 on the mold carriage, as above described in connection with Fig. 3, but in the present instance the shaft 25 carries a worm 45 which drives a worm gear 46 on a shaft 47 mounted in the standards 42 and 43. The shaft 47 is thus rotated continuously. Keyed to the shaft 47 is a mutilated gear pinion 48 which drives a gear 49 on a shaft 44 mounted in the standards 41 and 42. An intermittent step by step movement is thus imparted to the shaft 44. During a portion of each complete rotation of the pinion 48, locking surfaces 51 and 52 on the pinion 48 and gear 49, respectively, are in engagement, holding the gear 49 locked. The teeth 53 on the pinion 48 then engage the teeth 54 on the gear 49 and rotate the latter through an angle of 90 degrees.

Keyed to the shaft 44 are two spiders 55 each carrying four radially disposed carriers 56. Each carrier comprises a plurality of individual holders or supports 57. These holders or pockets 57 are designed to receive the bottles 10 as they are discharged from the machine 11. After a carrier 56 receives a charge of bottles, as indicated in Fig. 4, it is advanced step by step. The second step movement brings the carrier to a downwardly inclined position, which permits the bottles to be discharged by gravity. This discharge is controlled and temporarily delayed by shields 58 and 58′ which, as shown in Fig. 4, extend over the mouth of the carrier.

The shields are mounted for oscillating movement on the shaft 44. This movement is imparted to the shields by means of a crank 59 fixed to the shaft 47 and connected through a link 61 to a rock arm 62 connected to the shield 58. As shown in Fig. 5, the connection between the rock arm 62 and the shield 58 comprises a collar 63 carrying the arm 62, said collar being keyed to a bearing sleeve 64 on the shaft 44, to which sleeve is also keyed a collar 65 formed on the shield 58. The shield 58′ may be connected to the shield 58 by means of the collars 66 and 67 formed respectively on the shields and clamped to a bearing sleeve 68 on the shaft 44.

The operation of the mechanism shown in Figures 4 to 7 is as follows:

When a group of bottles is dropped from the molds of the blowing machine into the uppermost carrier 56, the parts are in the position shown in Figure 7 with bottles also held in the two carriers at the left hand side of the shaft 44. The shield 58 is at this time in its lowered position, supporting the lowermost group of bottles. The gear 48 is rotating in a clockwise direction, as indicated by the arrow (Fig. 7), the gear 49 and carriers 56 being at this time locked in stationary position. The movement of the pinion 48 carries the shield 58 upward to the Fig. 6 position, thereby releasing the bottles in the lower left hand carrier 56 and permitting them to drop into a chute 71, down which they slide by gravity to the conveyor 12. The lower ends of the shields are preferably stepped, as shown in Fig. 5, so that the three bottles of a group are released one by one, allowing the bottles to slide singly down the chute and onto the conveyor out of contact with each other.

When the pinion 51 has reached the Fig. 6 position, the bottles in the lowermost carrier 56 have been released, as just described, and the shield is in its uppermost position, in which it extends over the end of the next succeeding carrier 56. The gear teeth 53 are now ready to engage the teeth 54, so that the continued rotation of the gear 51 rotates the gear 49. The shield 58 is at the same time moved downward, thereby holding the bottles until the shield has been brought to its lowered position (Fig. 7) when the carriers are again brought to rest and the cycle of operations repeated.

As shown in Fig. 1, two chutes 71 are provided with their lower ends convergent, so that the bottles from both sets of carriers can be delivered to a comparatively narrow conveyor and still held out of contact with each other.

Modifications may be resorted to within the spirit and scope of my invention.

What I claim is:

1. The combination of a carriage mounted for rotation about a stationary axis, a plurality of carriers mounted on said carriage and each comprising a plurality of individual compartments for receiving articles, said carriers being normally held in an article supporting position on the carriage and brought in succession to an article receiving position by the rotation of the carriage, automatic means for successively shifting the carriers relative to the carriage to an article discharging position, and automatic means for depositing articles in all the compartments of a carrier while the carrier is at said receiving position.

2. Apparatus for transferring articles comprising, in combination, a carriage mounted for rotation about a stationary axis, means to continuously rotate the carriage, a plurality of carriers mounted on said carriage and arranged in upwardly and outwardly inclined positions to support the articles thereon, each of said carriers comprising a plurality of individual article holding compartments, automatic means to deposit articles in all the compartments of a carrier, when the latter reaches a predetermined position, and a stationary cam by which the carriers are held in said upwardly and outwardly inclined positions during a portion of their travel with the carriage, said cam being shaped to permit each carrier to swing down to a discharging position at a predetermined point in its travel.

3. The combination of a plurality of article carriers symmetrically arranged about an axis of rotation, each of said carriers comprising a plurality of compartments for receiving articles and holding them in spaced relation, said compartments being arranged about radially of said axis and open at their outer ends for receiving and discharging the articles, means to rotate the carriers and move them from an upwardly and outwardly inclined article receiving position to a downwardly and outwardly inclined discharging position, a shield overlying the outer ends of said compartments, and means for advancing the shield with said compartments as they approach the discharging position and then returning the shield to control the point of discharge of said articles.

4. The combination of a plurality of article carriers symmetrically arranged about an axis of rotation, each of said carriers comprising a plurality of compartments for receiving articles and holding them in spaced relation, said compartments being arranged about radially of said axis and open at their outer ends for receiving and discharging the articles, means to rotate the carriers and move them from an upwardly and outwardly inclined article receiving position to a downwardly and outwardly inclined discharging position, a shield extending over the outer ends of said compartments as they move toward discharging position, and automatic means to periodically oscillate said shield to and from a position to permit the discharge of the articles.

5. The combination of a plurality of article carriers symmetrically arranged about an axis of rotation, each of said carriers comprising a plurality of compartments for receiving articles and holding them in spaced relation, said compartments being arranged about radially of said axis and open at their outer ends for receiving and discharging the articles, means to rotate the carriers and move them from an upwardly and outwardly inclined article receiving position to a downwardly and outwardly inclined discharging position, a shield extending over the outer ends of said compartments as they move toward discharging position, and means to oscillate said shield to and from a position to permit the discharge of the articles, said shield formed to cause the articles from each carrier to be discharged one by one.

Signed at Toledo, in the county of Lucas and State of Ohio, this 29th day of March, 1924.

LEONARD D. SOUBIER.